US006994396B2

(12) United States Patent
Burleson (10) Patent No.: US 6,994,396 B2
(45) Date of Patent: Feb. 7, 2006

(54) ROTATABLE SAFETY SEATBACK FOR RECREATIONAL VEHICLES

(75) Inventor: Michael Allan Burleson, Tyler, TX (US)

(73) Assignee: System Engineering and Laboraties, Tyler, TX (US)

( * ) Notice: Subject to any disclaimer, the term of this patent is extended or adjusted under 35 U.S.C. 154(b) by 0 days.

(21) Appl. No.: 10/749,040

(22) Filed: Dec. 30, 2003

(65) Prior Publication Data

US 2004/0150255 A1  Aug. 5, 2004

Related U.S. Application Data

(60) Provisional application No. 60/437,430, filed on Dec. 31, 2002.

(51) Int. Cl.
  B63B 17/00  (2006.01)
  B62J 1/00  (2006.01)

(52) U.S. Cl. .............................. 297/215.12; 297/215.11; 297/353; 114/362; 114/363

(58) Field of Classification Search ........... 297/215.11, 297/215.12, 353, 17, 364, 365, 215.1; 114/362, 114/363

See application file for complete search history.

(56) References Cited

U.S. PATENT DOCUMENTS

| | | | |
|---|---|---|---|
| 377,147 A | | 1/1888 | Delaney |
| 1,240,587 A | * | 9/1917 | Mesinger ............... 297/215.12 |
| 3,822,917 A | * | 7/1974 | George .................. 297/215.12 |
| 3,887,231 A | * | 6/1975 | Bochynsky ............ 297/215.12 |
| 4,313,639 A | * | 2/1982 | Ware ..................... 297/215.12 |
| 4,506,754 A | * | 3/1985 | Hirano et al. ............... 297/353 |
| 4,953,911 A | * | 9/1990 | Hanagan ................ 297/215.12 |
| 5,501,168 A | * | 3/1996 | Zachary ...................... 114/363 |
| 5,997,088 A | * | 12/1999 | Stark et al. .............. 297/215.1 |
| 6,021,734 A | | 2/2000 | Sperberg ..................... 114/363 |
| 6,068,334 A | * | 5/2000 | Bonfilio ................. 297/215.12 |
| 6,206,399 B1 | * | 3/2001 | Schnitzenbaumer ... 297/215.12 |
| 6,299,254 B1 | | 10/2001 | Dinh et al. ................. 297/408 |
| 2002/0011745 A1 | * | 1/2002 | Petersen ................ 297/215.11 |

* cited by examiner

*Primary Examiner*—Peter M. Cuomo
*Assistant Examiner*—Stephen D' Adamo
(74) *Attorney, Agent, or Firm*—C. W. Alworth (57) ABSTRACT

A safety seatback for mounting to the rear of a watercraft is disclosed. The seatback rotates about the seat of the watercraft from an upright position to a boarding position. In the upright position the seatback prevents the passenger/rider from falling backward from the watercraft. In the boarding position the seatback does not interfere with a passenger/rider attempting to board the watercraft from the water and aids the person boarding the craft from the water. The seatback may be rotated by the passenger/rider from within the water or, in an alternate embodiment, may be remotely operated by the driver.

7 Claims, 11 Drawing Sheets

ROTATABLE SAFETY SEATBACK FOR RECREATIONAL VEHICLES

Priority is claimed from U.S. Provisional Application Ser. No. 60/437,430 filed on Dec. 31, 2002.

The present invention relates generally to a rotatable seatback support for use in recreational vehicles and in particular to small recreational vehicles such as personal watercraft.

BACKGROUND OF THE INVENTION

Present day Americans (and other nationals) have taken to the water in droves. Many people live on the water's edge, own various types of watercraft and participate in multitudinal water sports. Other people travel to the water to operate their watercraft and participate in water sports. In particular the public has been smitten with personal watercraft, i.e., a small high performance craft that is capable of carrying one person (the operator) but can usually accommodate one or more riders seated in tandem behind the operator. Such craft are referred to as "personal watercraft."

These craft are powered by an internal combustion engine that intakes water into an impellor driven pump and expels a jet of water out of the back of the craft, thus propelling the craft through the water. The craft has a shallow draft and is quite powerful. The operator typically sits towards the front of the craft, straddles the seat, somewhat like a motor cyclist, and holds onto the handle bars. The handle bars serve to turn the water jet nozzle and/or rudders thereby steering the craft and provide a grip for the operator to hold onto thereby allowing the operator to remain with the vehicle while traveling over the water. Most of these craft include a lanyard interlock whereby, if and when the operator falls off of the craft, the engine stops (or disengages) and the craft comes to a halt in the water. The operator is then faced with the task of remounting the vehicle.

The operator will generally swim up to the rear of the craft, reach up and grab a hand rail or "grip" located at the back of the seat. The operator can then pull on the hand grip and remount the vehicle. Rearward remounting is the only possible method by which one may remount the craft from the water for, if one tries to mount from the side, the craft will flip over.

As mentioned earlier, these watercraft are capable of carrying passengers, usually one, but larger machines may carry more, in tandem. Unfortunately, accidents occur because the rear passenger falls or is ejected rearward from the craft, particularly during rapid acceleration and/or while passing over choppy waters. Little or nothing is provided for the rear passenger to hold onto other than gripping the operator about the waist. This problem may be exacerbated when the passenger is child (or small person) for it is very difficult for a child (or small person) to reach around the waist of an adult.

A seatback could be permanently provided for the rearward passenger. (A similar approach may be taken for each passenger—assuming more than one passenger.) Unfortunately, when the rear passenger is ejected from the craft, the only reasonable way for that passenger to remount the craft is by climbing up over the back of the craft and sliding onto the seat. If a seatback were in permanent position, it may be difficult for the passenger to remount the craft. However, a seatback would seem to be a minimum safety requirement.

The prior art in watercraft considers seatbacks. For example Zachary (U.S. Pat. No. 5,501,168) discloses an Adjustable Sissy Bar Device for a Jet Ski. Zachary contemplates a retrofittable device that attaches to the jet ski (water recreational vehicle) and forms a back brace that may be adjusted up/down to fit the back of the passenger (or driver in a small jet ski). The device inherently blocks access to the seat, from the back of the vehicle, and has no quick release mechanism that would allow the "sissy bar" to be moved out of the way of the re-mounting rider.

Sperberg (U.S. Pat. No. 6,021,734) discloses a Personal Watercraft and Brace Assembly (therefore). The Sperberg device is similar to the Zachary device in that the device adjusts to fit the back of the rider and is positioned at the aft end of the vehicle seat. The Sperberg device suffers the same disadvantage as the Zachary device in that it blocks rear access to the seat and has no quick release.

Mesinger (U.S. Pat. No. 1,240,587) discloses a Saddle for Motor Cycles which discloses a back brace that is similar in concept to both Zachary and Sperberg in that the brace is adjustable. In a much earlier disclosure Delaney (U.S. Pat. No. 377,147) contemplates a Head-rest for Barbers' Chairs. The Delaney device is similar to that of Zachary, Sperberg and Mesinger in that the head-rest adjusts up/down to support the head of a person sitting in the chair.

In the area of head-rests, Dinh et al. (U.S. Pat. No. 6,299,254 is notable in that Dinh disclose a vehicle Head Restraint that is rotatable about the back of a vehicle seat. Dinh claim that their device " . . . is based on the object of simplifying the design of a retaining device for a head restraint . . . " The head-rest is designed to rotate automatically under the effect of electromagnetic solenoid from the "upper functioning position" to the "non-functioning position." Thus the device serves as a head restraint when up and has "no function" when it is down. Therefore the Dinh device does not contemplate or teach a rotatable swivel seatback for a watercraft.

Therefore there is a need for a passenger seatback on personal watercraft that will safeguard the passenger while the passenger is on the vehicle, yet will readily move out of the way to allow the passenger to remount the craft from the water, if and when the need occurs.

SUMMARY OF THE INVENTION

The instant device consists of a seatback that is rotatably attached behind the rearmost point of the watercraft seat. The seatback has a similar appearance as the passenger safety seatback on a motorcycle and extends from above the seat to about the midpoint of the back of an adult passenger. The seatback will prevent rearward ejection of the passenger and provide a more comfortable ride for the passenger because the passenger may lean back against a support.

When viewed from the normal position (i.e., the seatback in the upright position), the back underside of the seatback incorporates a hand grip and a quick release device taking the form of a pull cord handle, button or knob. (In the prototype device the quick release is incorporated into the rotating mechanism of the seatback.) When the seatback is in its normal (upright) position, the hand grip is located below the top of the seat.

The quick release device unlocks the rotatable seatback which is capable of rotating 360-degrees about an axis that aligns generally with the direction of the travel of the craft, is parallel to the seat and is centered between the port and starboard sides of the craft. The axis will further lie somewhere between the top and bottom of the seat. The actual rotation axis of the seatback will be slightly offset from the above defined axis so that when the seatback is in its normal position, the seatback will lean slightly backwards (from the seat) and so that, when the seatback is in its "boarding position," the seatback will project downwards, following the rear contour of the watercraft.

If the passenger is separated from the vehicle, the operator would return to pick up the passenger with the seatback in the upright (normal) and locked position. The passenger would reach up from the water and activate the quick release. The passenger then rotates the seatback from the upright position to the down (or boarding) position, thereby relocating the hand grip to an upward position. In the down (or boarding) position, the back of the seatback may be used as a cushioned ramp leading from the back of the craft up to the seat with the hand grip located at the top of the "ramp." The passenger simply reaches up, grasps the hand grip and pulls himself/herself up onto the seat. The passenger then rotates the seatback into its upright (normal) position at which time the seatback automatically locks in place.

It should be noted that if the driver is the only passenger and is ejected from the craft, the craft will automatically come to a halt (lanyard interlock). The driver would then swim to the craft and mount the craft in the manner described above.

DETAILED DESCRIPTION OF THE EMBODIMENT

The instant device is an important safety device and will reduce the risk of rearward ejection of the passenger to prevent exposure to the watercraft water jet blast or other injuries that may occur during rearward ejection. The instant device also provides protection for the rearward facing passenger who may be serving as a lookout for a towed water skier.

FIGS. 1 through 4 and 10 show the instant device mounted on a watercraft. As shown in the Figures the device is mounted at the aft end of the craft rotatably attached behind the passenger seat. (Although not shown, a similar seatback may be mounted midway along the seat for use by the operator. In the case of a three or more person craft, seats may be added at required positions along the seat. The instant device will be described for a single passenger seated at the rear of the craft.)

Figure 3:
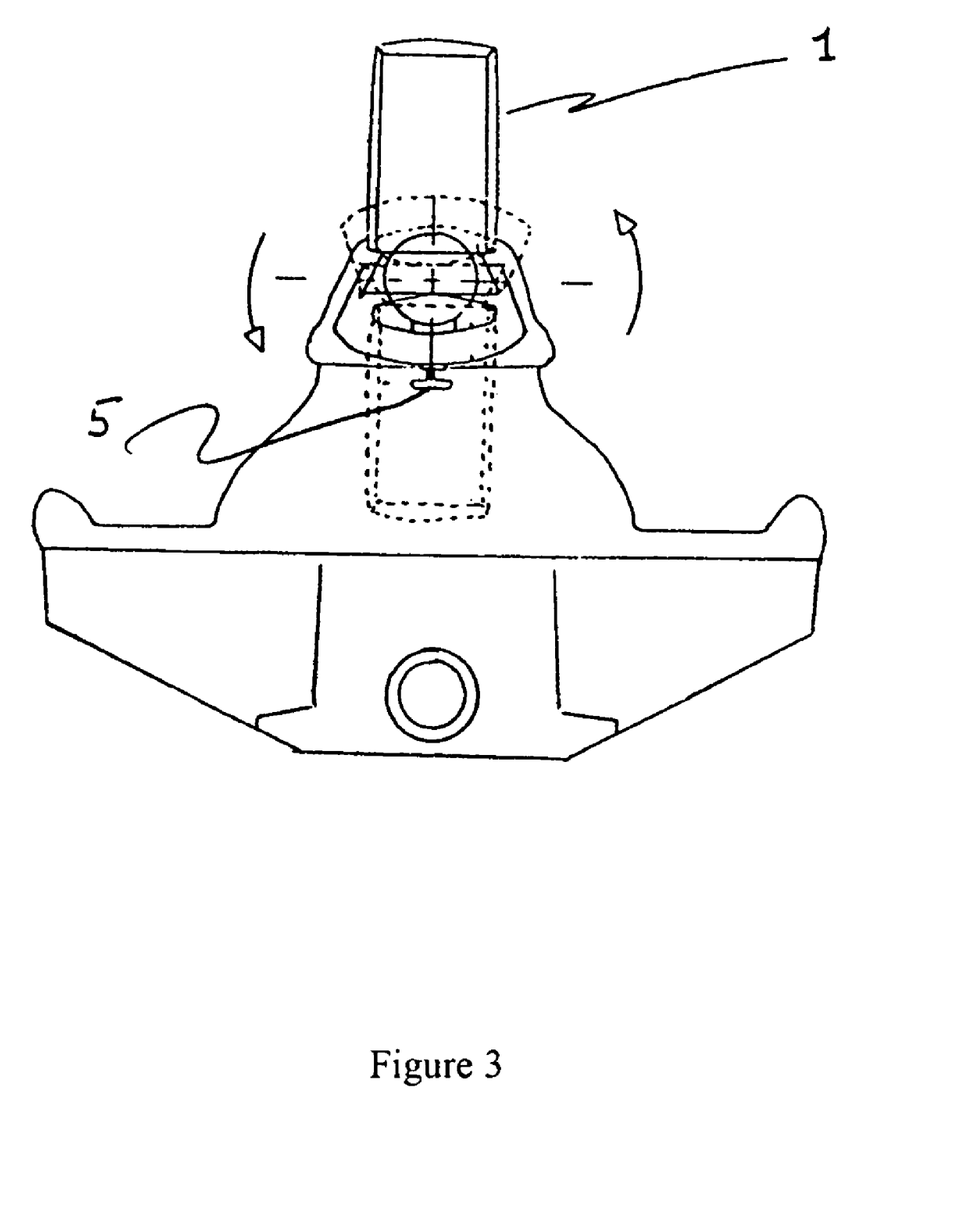
FIG. 3 is an aft view of the instant device on a watercraft. The dotted lines indicate the down or boarding position.
Figure 4:
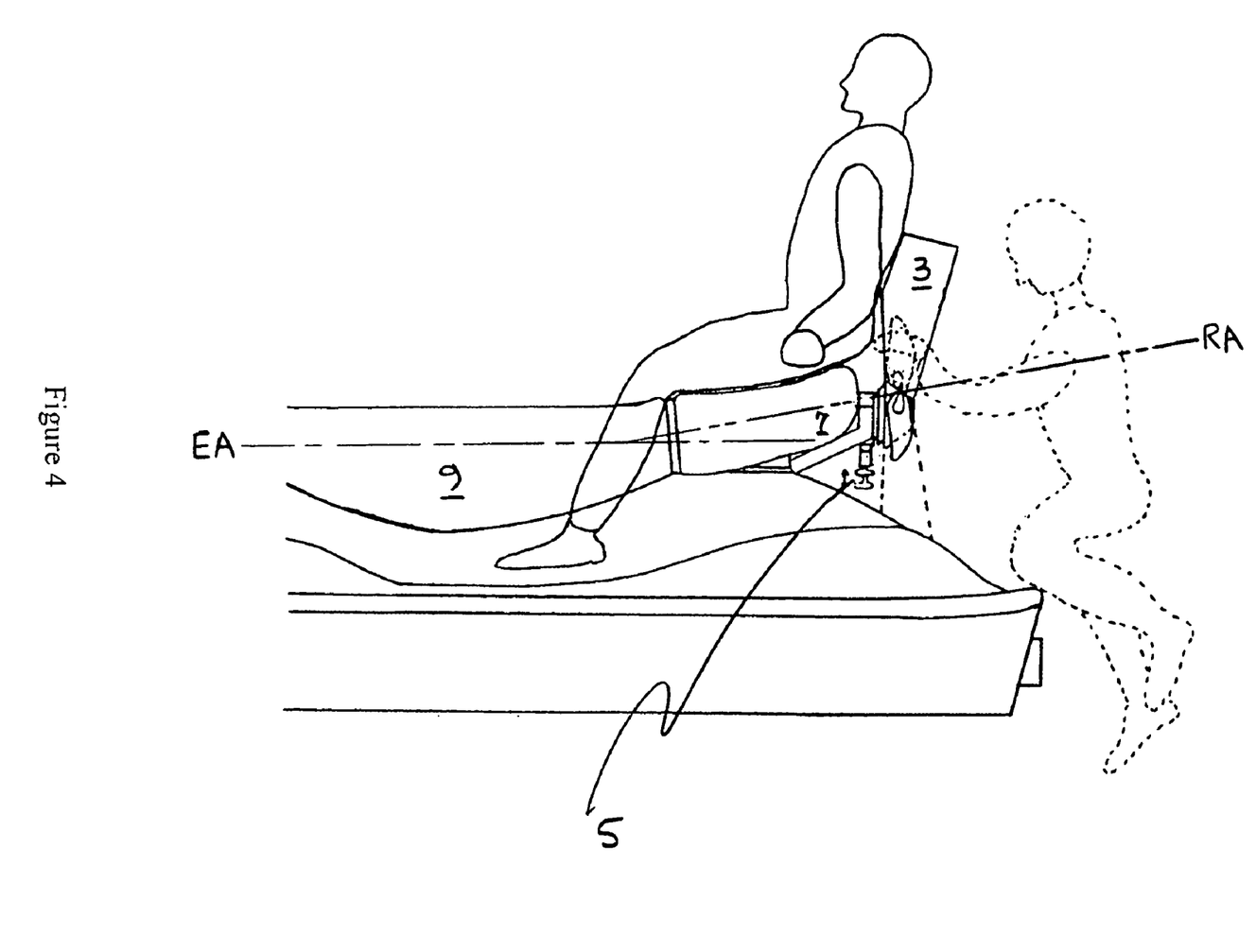
FIG. 4 is a side-on view, taken from the port side, showing a passenger in place on the craft leaning against the instant device. The dotted lines indicate the down or boarding position and show a passenger remounting the craft.
Figure 5:
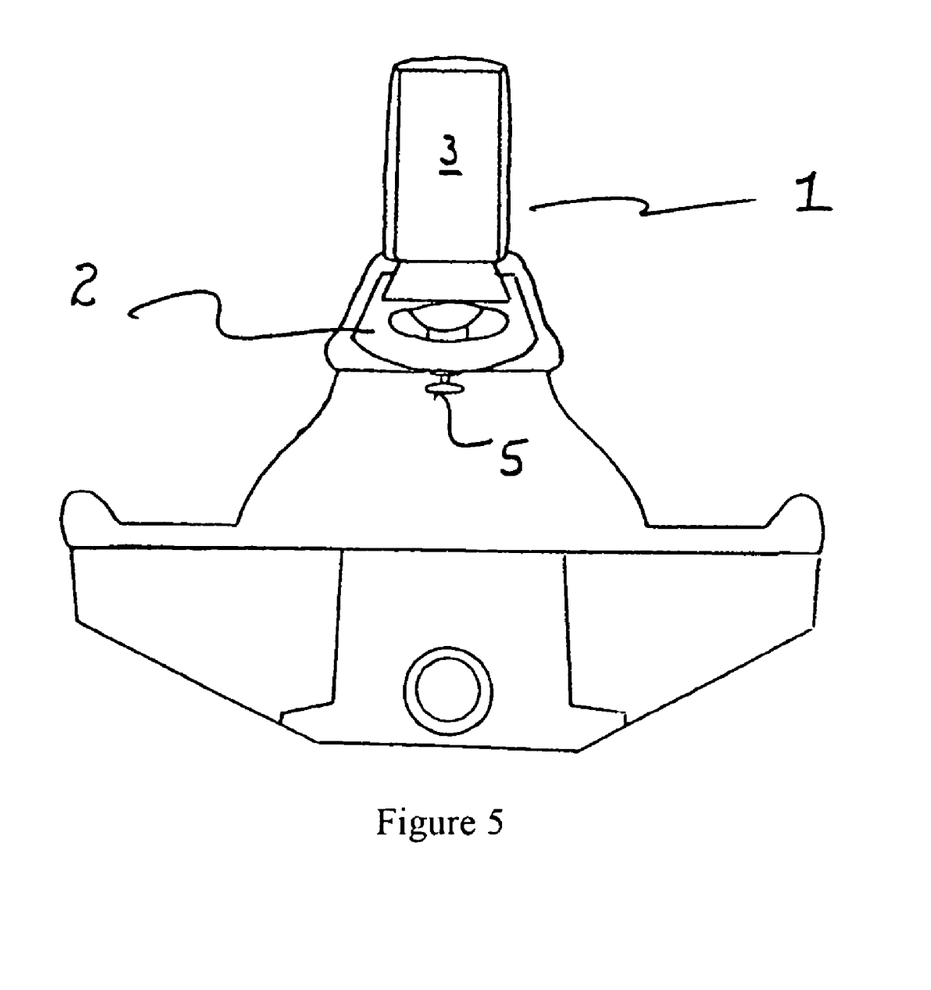
FIG. 5 shows the instant device installed on a personal watercraft in the upright or normal position.
Figure 6:
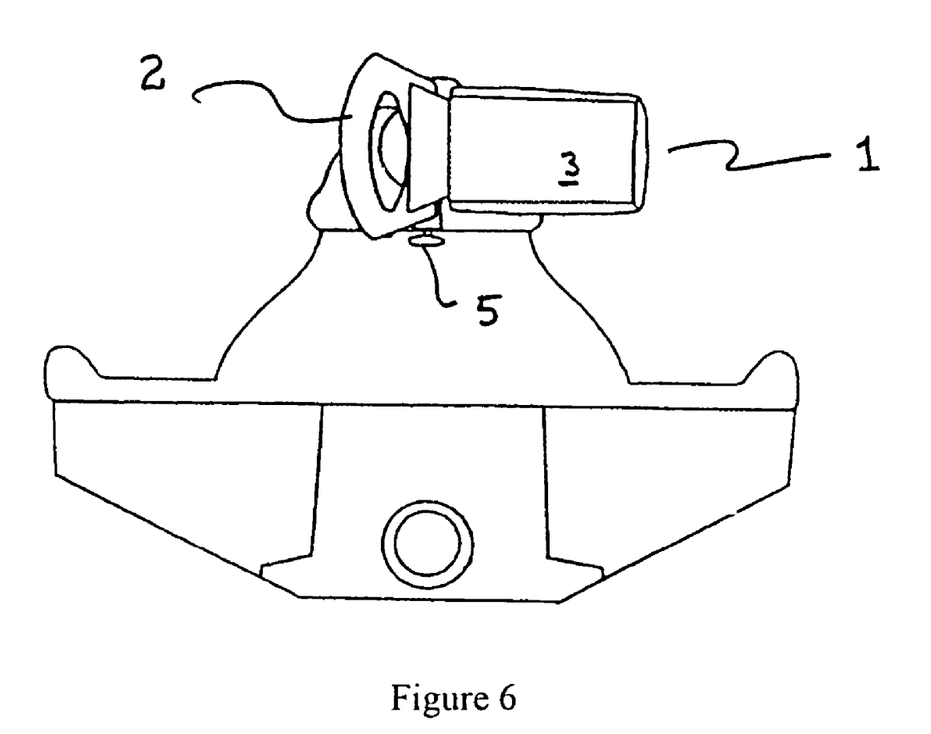
FIG. 6 shows the instant device installed on a personal watercraft half-way between its upright and down positions.
Figure 7:
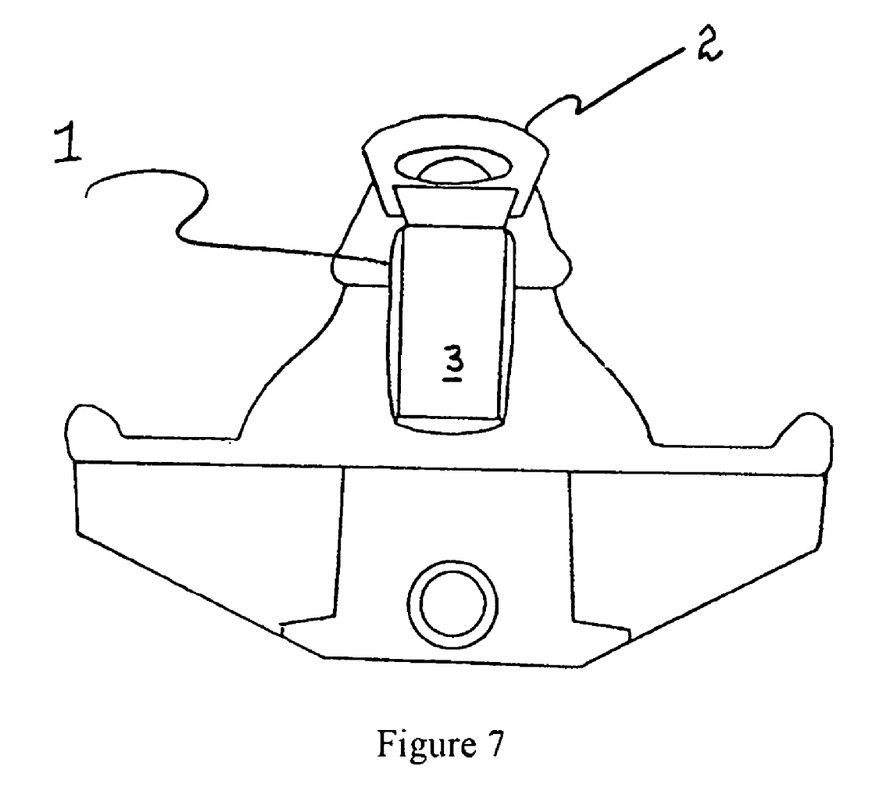
FIG. 7 shows the instant device installed on a personal watercraft in the down or re-boarding position.

FIGS. 3 and 4 clearly show how the seatback is designed to rotate about a rotation axis, RA, which is angled to an extended axis, EA, that aligns generally with the direction of the travel of the craft (see FIG. 10), is parallel to the seat and is centered between the port and starboard sides of the craft. The extended axis, EA, will further lie somewhere between the top and bottom of the seat. The key to the concept behind the instant device is the fact that the seatback rotates out of the way of the boarding passenger about the rotation axis, RA. As stated, the actual rotation axis, RA, of the seatback will be slightly angled at an offset angle, $\beta$, from the extended axis so that when the seatback is in its normal position, the seatback will lean slightly backwards (from the seat) and so that, when the seatback is in its "boarding position," the seatback will project downwards, following the rear contour of the watercraft.

The seatback angle, $\alpha$, between the seatback and the rotation axis remains fixed and like the offset angle, $\beta$, must be set by the designer so that the upright position of the seatback is comfortable to the rider and so that when the seatback is in the boarding position there is no interference with the watercraft and can vary between 0 and about 20 degrees. Both angles are acute angles and even when summed together will be less than 120 degrees. The choice of exact values can readily be determined for each watercraft based on the above description.

A hinged seatback could be employed and would be hinged at the end of the seat such that the hinged seatback folds forward to lie parallel to the top of the seat. The problem associated with a forward hinge movement becomes very apparent once the passenger is seated on the seat on top of the seatback—how does the passenger restore the seatback to its upright position? There is simply not enough room on personal watercraft for the passenger to move forward while restoring the seatback to its upright (normal) position.

In a similar manner, the hinged device may be designed to fold backward, assuming a position shown by the dotted lines in FIG. 4. This approach has an obvious disadvantage—the seat, when it flops into the down position, can readily hit the passenger who is attempting to remount the craft. Furthermore, if the latching mechanism fails, the passenger could be ejected backward. Thus, the rotatable approach taken by the instant device.

In the instant device, if the latching mechanism fails, the seatback will wobble from side to side giving an indication of locking failure—the seatback will not catastrophically fail.

Figure 1:
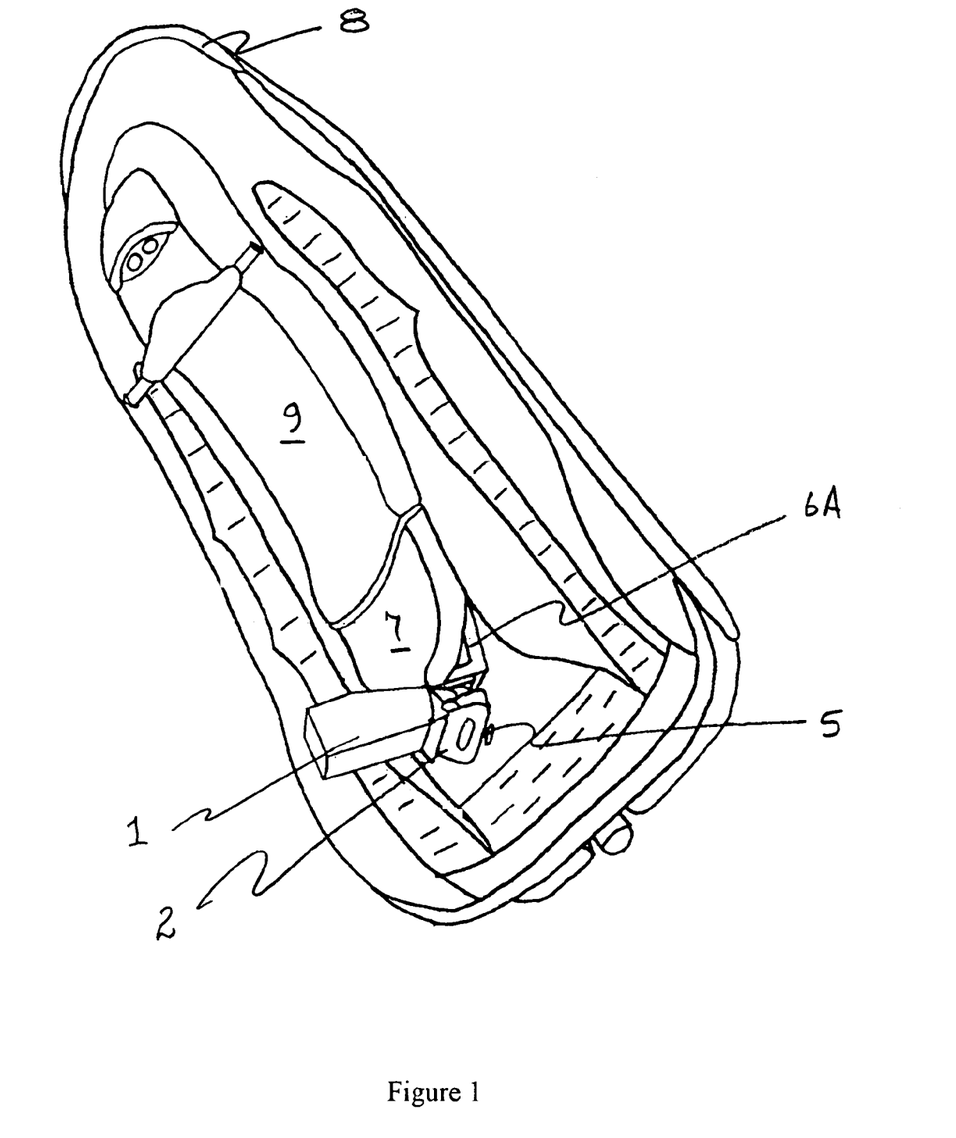
FIG. 1 is an isometric view and shows the instant device in its upright or normal position mounted to the frame of the watercraft.
Figure 2:
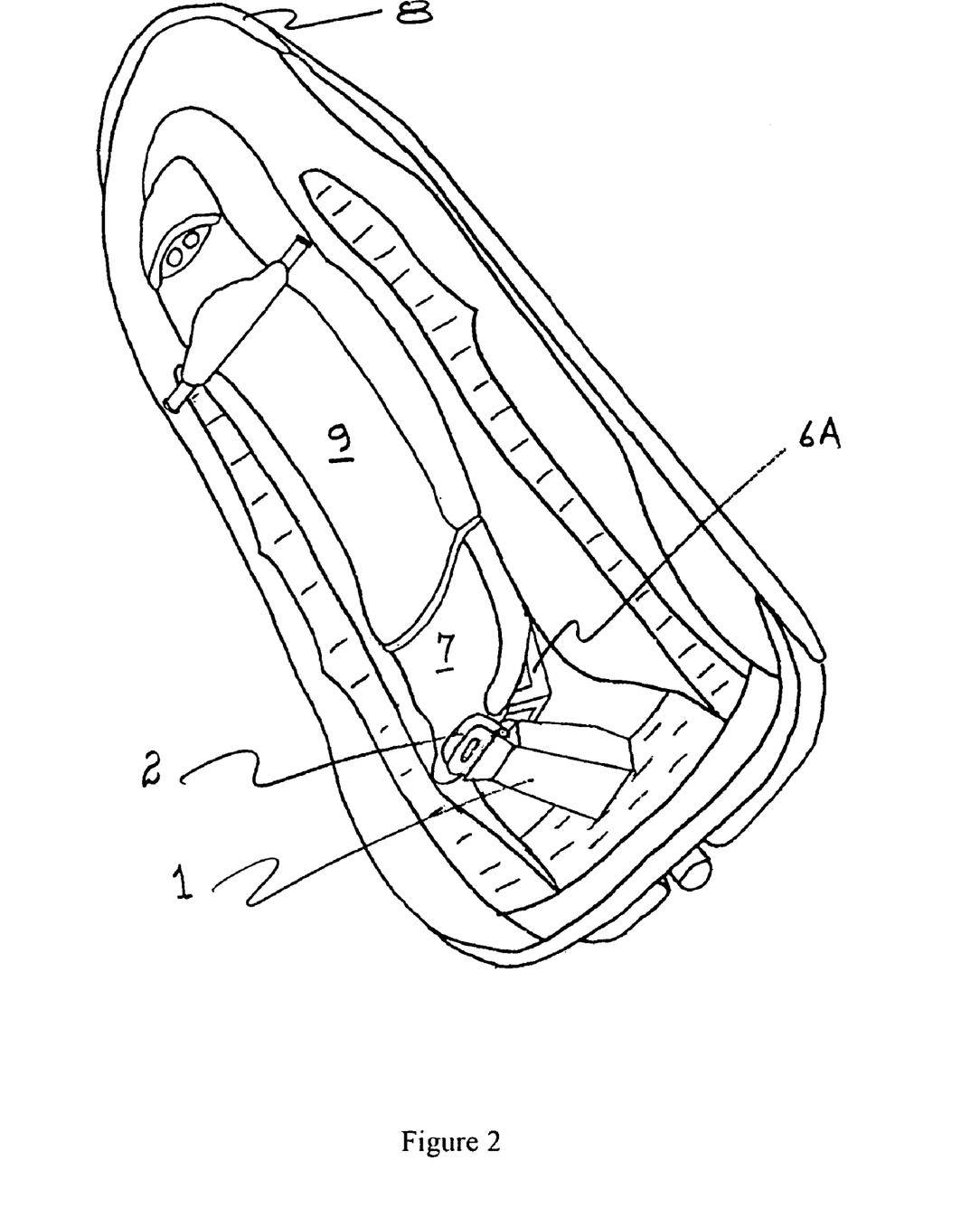
FIG. 2 is the same view of FIG. 1 and shows the instant device in its down or re-boarding position.
Figure 8:
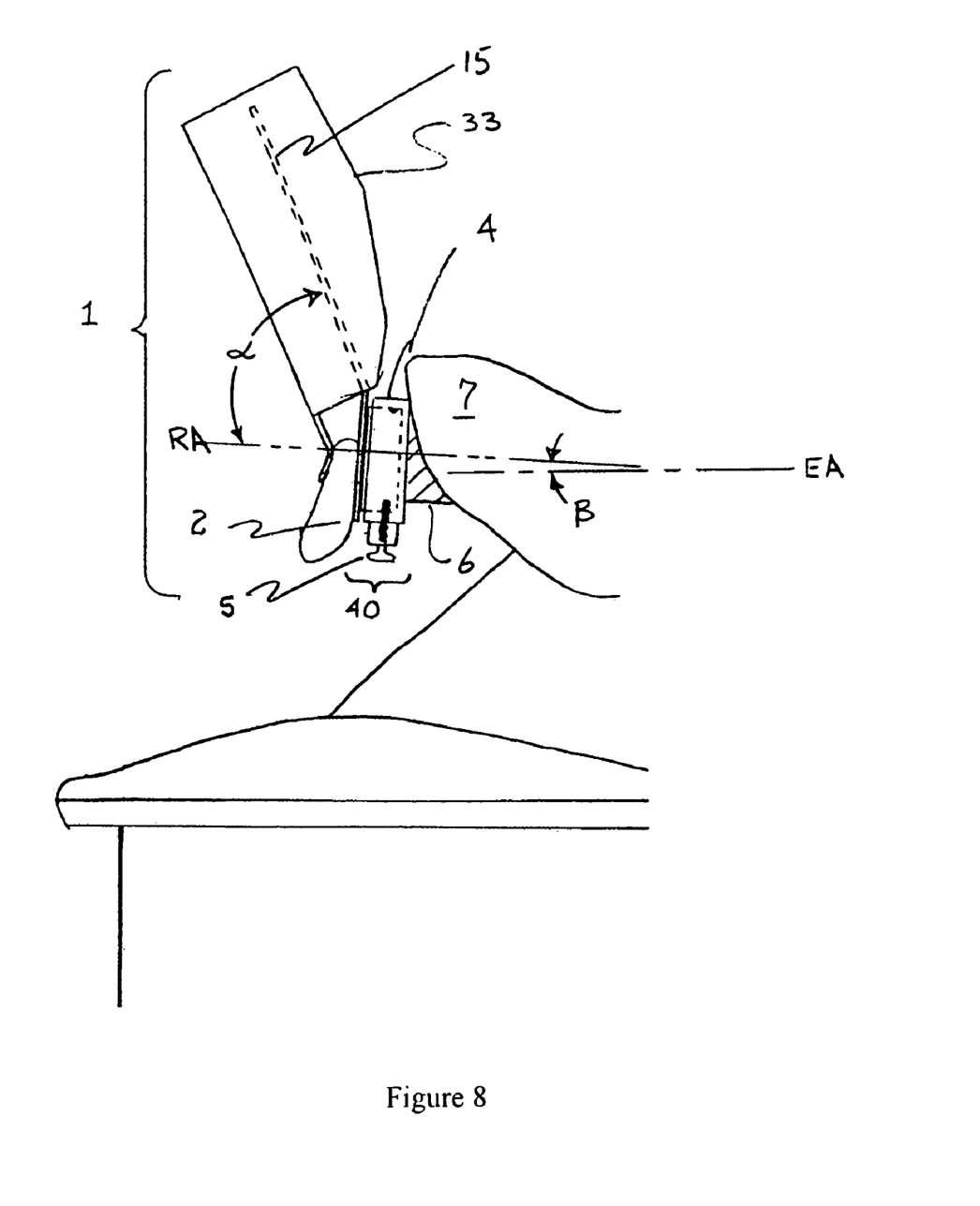
FIG. 8 shows the rotatable mechanism of the instant device mounted to the seat of the watercraft and shows, in particular, the quick release pull cord (or knob).
Figure 9:
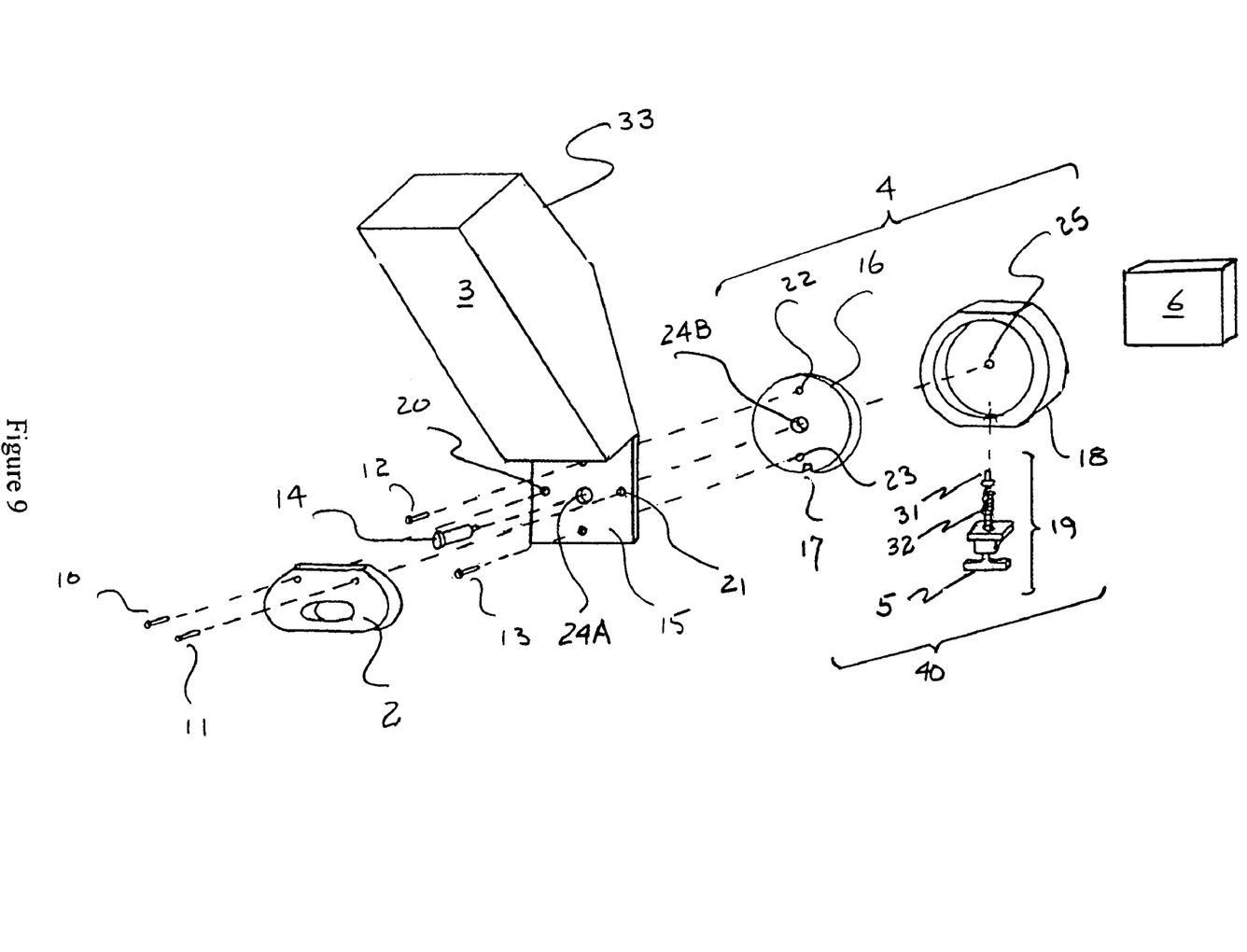
FIG. 9 is a further illustration, giving more details, of the instant device shown in FIG. 8.
Figure 10:
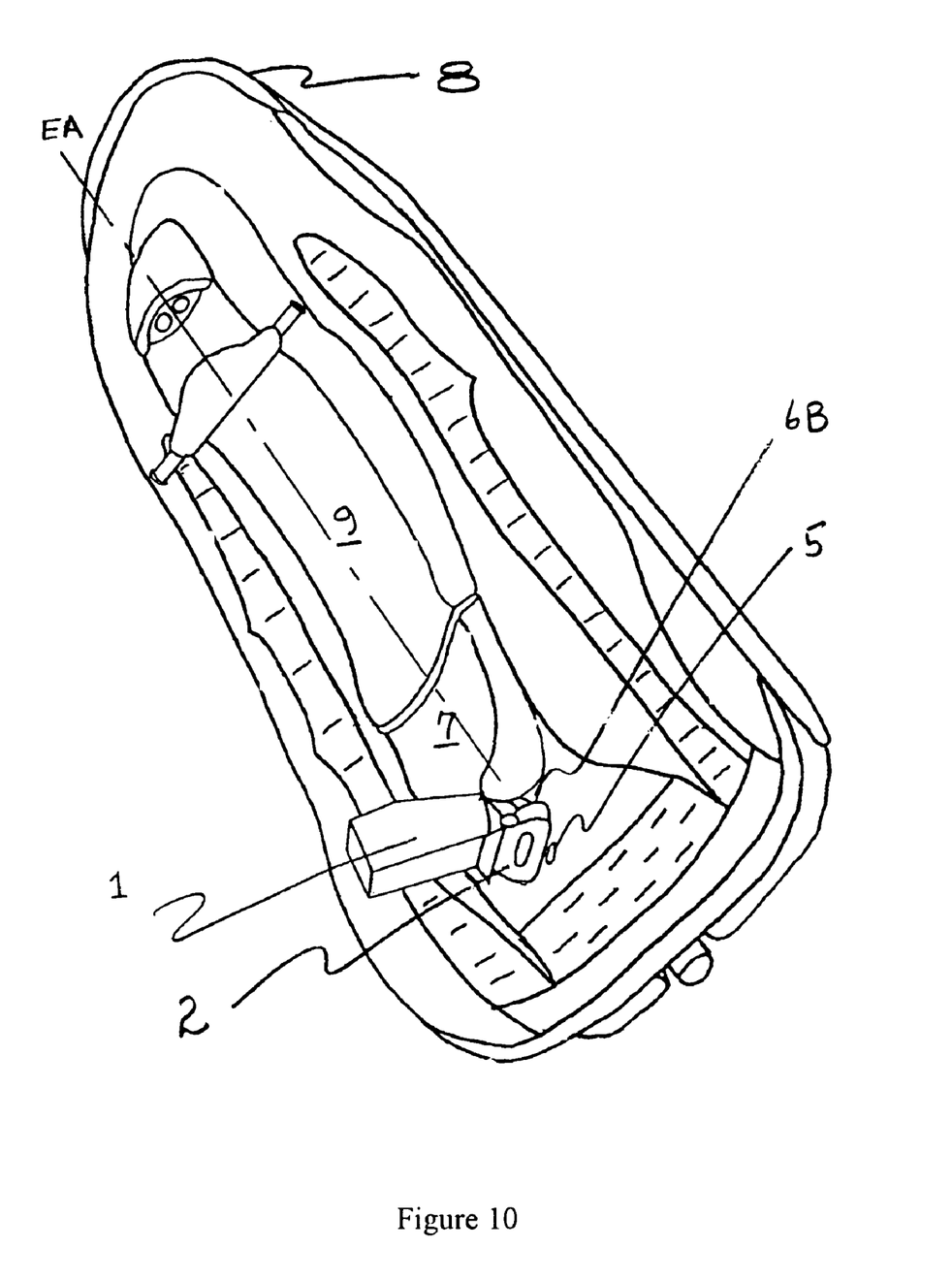
FIG. 10 is an isometric view and shows the instant device in its upright or normal position mounted to the seat of the watercraft (alternate mounting).

Referring now to FIGS. 8 and 9, the instant device is relatively simple and consists of a seatback, 3 (made from a formed seatback plate, 15, covered with a suitable pad, 33), a hand grip mounted to the plate, 2, (at the bottom of the plate when the seat is in its upright position) and means for rotating, 4, and latching, 19, the seatback about the previously defined axis, RA. The actual seatback plate has an upper section which is covered by the padding, 33, and a lower section to which the handle, 2, and the rotating means are attached. The upper and lower sections are formed at an acute angle, the seatback angle, $\alpha$, defined earlier. The rotating/latching means is in turn attached to the craft behind the seat via a suitable mount to the frame, 8, as shown in FIGS. 1 and 2 or to the seat, 7, as shown in FIG. 10 (items 6A or 6B respectively).

The rotating and latching means, 40, comprises a simple rotation means, 4, and a latch mechanism, 19. The latch mechanism, 19, keeps the seatback in the upright position until the passenger pulls on the release knob, 5, and rotates the seatback, 3, into the down position while holding onto the knob until the latch passes the up-lock point.

The prototype is shown in simple detail in FIG. 9. The padded seatback, 33, is suitably attached to seatback plate, 15, which serves as the seatback and support for the rotating mechanism, 4, and handgrip, 2. The simple rotating mechanism consists of a swivel, 16, which freely rotates within a swivel plate, 18, about a swivel pin, 14, which serves to retain the swivel, 16, within the swivel plate, 18. The swivel plate, is attached to a mounting bracket, 6, which is adaptable to mount to the frame, 8, or the seat, 7, or the watercraft. (Item 6A or 6B respectively—see FIGS. 1, 2 or 10.)

The seatback plate, 15, is attached to the swivel, 16, by bolts, 12 and 13, which engage bolt holes, 22 and 23, in the swivel, 16. The swivel pin, 14, passes through swivel pin apertures, 24A and 24B in the seatback plate and swivel to engage a swivel pin bolt hole, 25, in the swivel plate, 18. The swivel pin has a "head" which serves to hold the seatback/swivel assembly within the swivel plate. The hand grip, 2, is attached by bolts, 10 and 11, to the seatback plate, 15, which engage bolt holes 20 and 21.

The prototype latch mechanism, 19, consists of a spring, 32, loaded pin, 31, attached to a handle or quick release knob, 5. The pin, 31, in turn catches the catch point, 17, formed within the swivel 16.

The use of the device is fairly apparent. After a watercraft maneuver in which the passenger falls or is ejected into the water, or if a swimmer needs to be picked up, the operator would carefully bring the craft back to the passenger. The passenger would reach up, from the water, and pull on the release knob, 5, (see FIGS. 3 through 6). The passenger would then rotate the seatback into its down position (see FIGS. 3 through 7). The passenger then climbs up on the back of the craft (see FIGS. 3 and 4) using the seatback hand grip, 2, as an assist. The passenger would slide over the seat, resume a seated position and rotate the seatback to its upright or normal position.

The prototype rotating, 4, and latching, 19, mechanisms have been described above. It should be apparent that the prototype may be modified. For example the swivel, 16, can be incorporated into the seatback plate, 15, thereby eliminating the attachment bolts 12 and 13. the actual mechanical design of the rotating assembly is a matter of engineering choice and variants thereof fall within the scope of the invention.

Further, the latch mechanism, 19, can be designed to hold open until the seatback is rotated into the down or boarding position at which time the mechanism resets so that when the seat is rotated back to its normal position the latch pops back into place thereby holding the seatback in its upright or normal position. The latch mechanism can further be modified to lock the seatback in the down position or a detent technique may be used to provide positive seatback position when the seatback is down.

Not shown are optional arms which may be mounted to the seatback. The arms would be interconnected to the latch mechanism so that when the mechanism is activated the arms would move upward (or downward) thereby entering a position that makes the arms parallel to the seatback. In this position the seatback may be rotated into its down position.

There are a series of options that can be incorporated with the device. For example, an interlock system can be incorporated into the latch mechanism that provides the operator an audible or visual alarm or both, indicating the status of the seatback. I.e., up and locked or unlocked. As part of a safety circuit a "passenger-in-place" alarm could be added to the passenger seat—essentially a weight switch that would alarm if the passenger were not in place. Remember that the passenger (and operator) will move up and down on the seat while the craft is in motion; therefore, some delay will have to be incorporated. An engine start preventative interlock may be incorporated into the electrical system of the watercraft. The interlock would prevent engine start if the seatback is not upright and locked.

Figure 11:
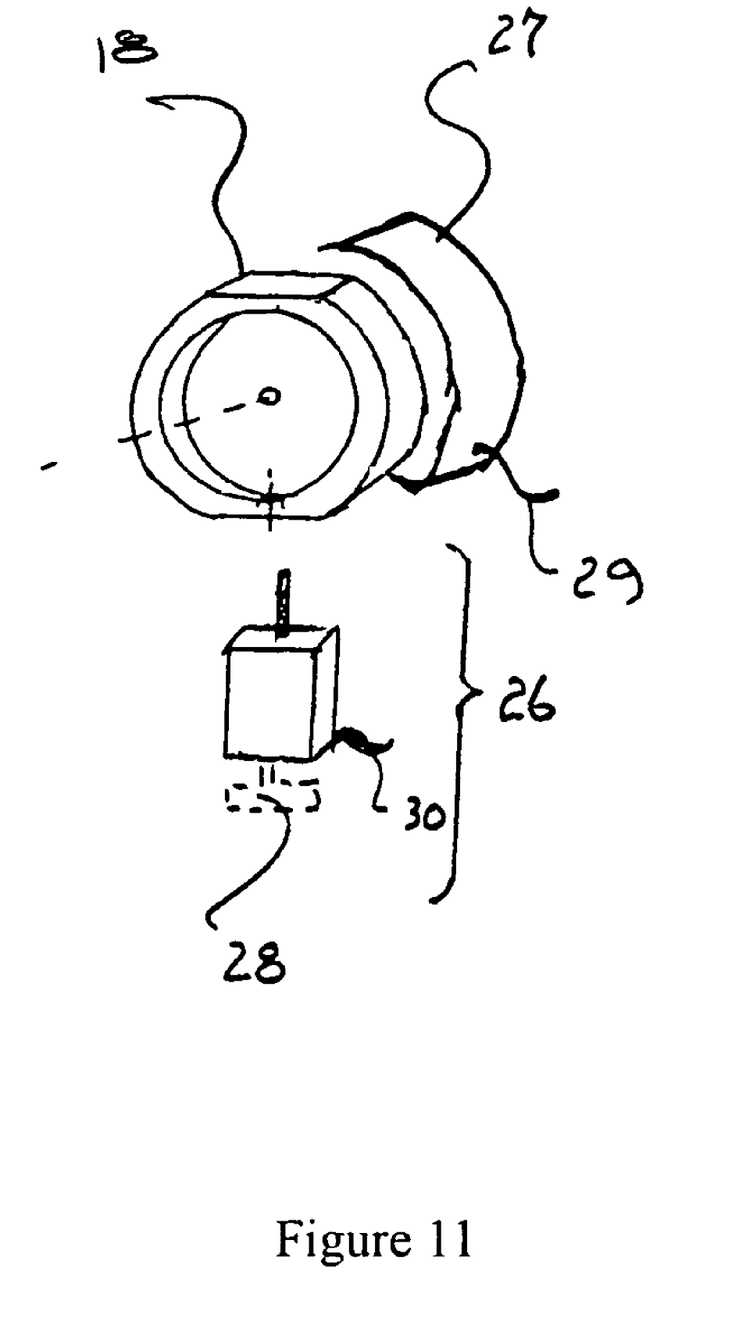
FIG. 11 shows the sophisticated embodiment utilizing electromagnetic assemblies to control seatback latching and rotation. For clarity the mounting means and seatback are not shown.

A sophisticated embodiment, as shown in FIG. 11, can be utilized. FIG. 11 is simplified to illustrate the pertinent details and shows the swivel plate, 18, attached to a rotating mechanism, 27. The simple latch mechanism has been replaced with a solenoid assembly, 26. The rotating, 27, and latch control, 26, mechanisms are connected to control circuits (not shown) in the watercraft by leads, 30 and 29, respectively.

In this embodiment the control of the seatback is purely in the hands of the operator. If the need arises in which a passenger must be retrieved from the water, the operator would carefully approach the passenger (swimmer in the water) and press a button on the control panel. The button controls the latch, 26, that unlocks the seatback and controls the rotation mechanism, 27, together the two assemblies rotate the seatback into the down position. Once the passenger is in place, the operator would press the button and the seatback would return to its upright position. In the alternative, the passenger could manually rotate the seatback by reaching up an pulling on an optional handle, 28.

The above descriptions assume that the passenger is ejected from the craft. If the driver is the only passenger and is ejected from the craft, the craft will automatically come to a halt (lanyard interlock). The driver would then swim to the craft and mount the craft in the manner described in the preceding paragraphs. In the case of the sophisticated embodiment, the driver would active the automatic rotation of the seatback using the optional handle.

Finally, the device has been described for the rearmost passenger on a watercraft. The inventor envisions variants of the device that may serve as a rotatable seatback for the operator. In larger craft that are capable of carrying more than one passenger, the inventor envisions embodiments that will serve every potential passenger/operator.

There has been described the best mode and preferred mode for a rotatable safety seatback for use with watercraft and the inventor envisions such a device that rotates about an extended axis parallel to the water line that may be activated by a swimmer in the water. The inventor envisions the remotely operated embodiment and embodiments that may serve the operator or additional passengers. Such concepts disclosed, various embodiments and variants are set forth in the flowing claims.

Item Listing

This index is offered as an aid to Examination and may be included in the application at the discretion of the Examiner.

1 In general the Rotatable Safety Seatback

2 Hand Grip

3 Back of Rotatable Safety Seatback

4 In general the Rotating Mechanism

5 Quick Release Knob
6 Adapter Plate
  mounts to vehicle frame as 6A
  mounts to vehicle seat as 6B
7 Vehicle Passenger Seat
8 In general the vehicle
9 Vehicle Driver Seat
10 Hand Grip Attachment Bolt
11 Hand Grip Attachment Bolt
12 Attachment Bolt
13 Attachment Bolt
14 Swivel Pin
15 Seatback plate
16 Swivel
17 Catch Point
18 Swivel Plate
19 Quick Release Latch Mechanism
20 Hand Grip Attachment Bolt Hole
21 Hand Grip Attachment Bolt Hole
22 Attachment Bolt Hole
23 Attachment Bolt Hole
24 Swivel Pin Aperture
  24A in seatback plate
  24B in swivel
25 Swivel Pin Bolt Hole
26 Electromagnetic Locking Assembly
27 Seatback Rotation Assembly
28 Optional Safety Actuator
29 Control Leads
30 Control Leads
31 Latch Pin
32 Spring
33 Seatback Pad
40 In general the Combination of the Rotating and Latching Means
RA Rotational Axis
EA Extended Axis
α Angle between seatback and RA
β Angle between EA and RA or "offset angle"

I claim:

1. A rotatable safety seatback for attachment to a personal watercraft having a seatback control circuit and a seat with a longitudinal axis extending between the front of the seat and the rear of the seat, the rotatable safety seatback comprising:
   a seatback having an upright position and a boarding position;
   seatback rotational mounting means adapted to rotatably attach said seatback to the personal watercraft such that said seatback is rotatable through approximately 180 degrees about the longitudinal axis between said upright position and said boarding position; and
   electromagnetic locking means integral to said rational mounting means for retaining said seatback in said upright position;
   wherein said seatback rotation means and said electromagnetic locking means are controlled by the seatback control circuit such that when the seatback circuit is activated said seatback rotates to said boarding position and when said seatback circuit is deactivated the seatback returns to said upright position.

2. The device of claim 1 further having a safety actuator wherein when said safety actuator is actuated said seatback control circuit rotates said seatback to said boarding position.

3. The device of claim 1 wherein the personal watercraft further has a frame and wherein said rotational mounting means is adapted to attach to the frame of the personal watercraft.

4. The device of claim 1 wherein said rotational mounting means is adapted to attach to the seat of the personal watercraft.

5. A rotatable safety seatback for attachment to a personal watercraft having a seat the seat having a longitudinal axis extending between the front of the seat and the rear of the seat, the rotatable safety seatback comprising:
   a seatback having an upright position and a boarding position;
   a swivel plate;
   a swivel attached to said seatback;
   a swivel pin;
   a latch pin;
   a quick release knob attached to said latch pin;
   a spring, and
   mounting means adapted to rotatably attach said swivel plate to the personal watercraft;
   wherein said latch pin and said spring are integrally mounted within said swivel plate and wherein said spring loads said latch pin such that said latch pin retains said seatback in said upright position until released by pulling on said quick release knob; and
   wherein said swivel is received by said swivel plate and held within said swivel plate by said swivel pin, such that said swivel freely rotates within said swivel plate such that said seatback is rotatable through approximately 180 degrees about the longitudinal axis between said upright position and said boarding position.

6. The device of claim 5 wherein the personal watercraft further has a frame and wherein said mounting means is adapted to attach said swivel plate to the frame of the personal watercraft.

7. The device of claim 5 wherein said mounting means is adapted to attach said swivel plate to the seat of the personal watercraft.

* * * * *